US012794519B2

(12) United States Patent
Dizdar et al.

(10) Patent No.: US 12,794,519 B2
(45) Date of Patent: Nov. 10, 2026

(54) PRECODING AND SCHEDULING WHILE MINIMIZING AGE OF INCORRECT INFORMATION FOR MULTIPLE ACCESS SYSTEMS

(71) Applicant: VIAVI Solutions Inc., Chandler, AZ (US)

(72) Inventors: Onur Dizdar, London (GB); Stephen Wang, London (GB)

(73) Assignee: VIAVI Solutions Inc., Chandler, AZ (US)

( * ) Notice: Subject to any disclaimer, the term of this patent is extended or adjusted under 35 U.S.C. 154(b) by 42 days.

(21) Appl. No.: 18/535,008

(22) Filed: Dec. 11, 2023

(65) Prior Publication Data

US 2025/0192832 A1 Jun. 12, 2025

(51) Int. Cl.
*H04B 7/02* (2018.01)
*H04B 7/0456* (2017.01)
*H04W 24/02* (2009.01)

(52) U.S. Cl.
CPC .......... *H04B 7/0456* (2013.01); *H04W 24/02* (2013.01)

(58) Field of Classification Search
CPC ............................. H04B 7/0456; H04W 24/02
USPC .......................................................... 376/267
See application file for complete search history.

(56) References Cited

U.S. PATENT DOCUMENTS 10,552,599 B2 * 2/2020 Tommy ................... G06F 21/36
2015/0256242 A1 * 9/2015 Morita .............. H04L 25/03942
375/267

OTHER PUBLICATIONS

Chen, J., et al., "Age of Incorrect Information in Semantic Communications for NOMA Aided XR Applications", IEEE Journal of Selected Topics in Signal Processing, vol. 17 (5), Jun. 2, 2023, pp. 1093-1105, XP011953248, ISSN: 1932-4553, DOI:10.1109/JSTSP.2023.3282836.

Cheng., T., et al., "Resource Allocation and Common Message Selection for Task-Oriented Semantic Information Transmission With RSMA", IEEE Transactions on Wireless Communications, IEEE Service Center, Piscataway, vol. 23(6), Oct. 31, 2023, pp. 5557-5570, XP011972543, ISSN: 1536-1276, DOI: 10.1109/TWC.2023.3327127.

Extended European Search Report for European Application No. EP242183028 dated Apr. 22, 2025, 7 pages.

(Continued)

*Primary Examiner* — Helene E Tayong
(74) *Attorney, Agent, or Firm* — Harrity & Harrity, LLP

(57) ABSTRACT

In some implementations, a transmitter may determine that a difference between a total age of incorrect information (AoII) obtained in a current iteration of an iterative algorithm and a total AoII in a previous iteration of the iterative algorithm satisfies a tolerance factor for algorithm convergence. The transmitter may use the iterative algorithm to solve a convex optimization problem based on a plurality of iterations that continue until an objective function associated with AoII converges to within the tolerance factor for algorithm convergence. The transmitter may determine a precoder matrix and a vector of scheduling indicators from a solving of the convex optimization problem. The transmitter may transmit, using a downlink multi-user communication framework based on rate-splitting multiple access (RSMA) in a semantic-aware network, one or more updates to one or more receivers based on the precoder matrix and the vector of scheduling indicators.

20 Claims, 5 Drawing Sheets

200

(56) References Cited

OTHER PUBLICATIONS

Matthiesen, B., et al., "Globally Optimal Spectrum- and Energy-Efficient Beamforming for Rate Splitting Multiple Access", IEEE Transactions on Signal Processing, vol. 70, Oct. 12, 2022, pp. 5025-5040, XP011925724, ISSN: 1053-587X, DOI: 10.1109/TSP.2022.3214376.

* cited by examiner

100

PRECODING AND SCHEDULING WHILE MINIMIZING AGE OF INCORRECT INFORMATION FOR MULTIPLE ACCESS SYSTEMS

BACKGROUND

Wireless communication systems are widely deployed to provide various telecommunication services such as telephony, video, data, messaging, and broadcasts. A wireless network may include one or more network nodes that support communication for wireless communication devices, such as a user equipment (UE).

SUMMARY

In some implementations, a method includes determining, by a transmitter, that a difference between a total age of incorrect information (AoII) obtained in a current iteration of an iterative algorithm and a total AoII in a previous iteration of the iterative algorithm satisfies a tolerance factor for algorithm convergence; using, by the transmitter and based on the difference satisfying the tolerance factor for algorithm convergence, the iterative algorithm to solve a convex optimization problem based on a plurality of iterations that continue until an objective function associated with AoII converges to within the tolerance factor for algorithm convergence; determining, by the transmitter, a precoder matrix and a vector of scheduling indicators from a solving of the convex optimization problem; and transmitting, by the transmitter and using a downlink multi-user communication framework based on rate-splitting multiple access (RSMA) in a semantic-aware network, one or more updates to one or more receivers based on the precoder matrix and the vector of scheduling indicators.

In some implementations, a transmitter includes one or more memories; and one or more processors, communicatively coupled to the one or more memories, configured to: determine that a difference between a total AoII obtained in a current iteration of an iterative algorithm and a total AoII in a previous iteration of the iterative algorithm satisfies a tolerance factor for algorithm convergence; use, based on the difference satisfying the tolerance factor for algorithm convergence, the iterative algorithm to solve a convex optimization problem based on a plurality of iterations that continue until an objective function associated with AoII converges to within the tolerance factor for algorithm convergence; determine a precoder matrix and a vector of scheduling indicators from a solving of the convex optimization problem; and transmit, using a downlink multi-user communication framework based on RSMA in a semantic-aware network, one or more updates to one or more receivers based on the precoder matrix and the vector of scheduling indicators.

In some implementations, a non-transitory computer-readable medium storing a set of instructions includes one or more instructions that, when executed by one or more processors of a transmitter, cause the transmitter to: determine that a difference between a total AoII obtained in a current iteration of an iterative algorithm and a total AoII in a previous iteration of the iterative algorithm satisfies a tolerance factor for algorithm convergence; use, based on the difference satisfying the tolerance factor for algorithm convergence, the iterative algorithm to solve a convex optimization problem based on a plurality of iterations that continue until an objective function associated with AoII converges to within the tolerance factor for algorithm convergence; determine a precoder matrix and a vector of scheduling indicators from a solving of the convex optimization problem; and transmit, using a downlink multi-user communication framework based on RSMA in a semantic-aware network, one or more updates to one or more receivers based on the precoder matrix and the vector of scheduling indicators.

DETAILED DESCRIPTION

Figure 1:
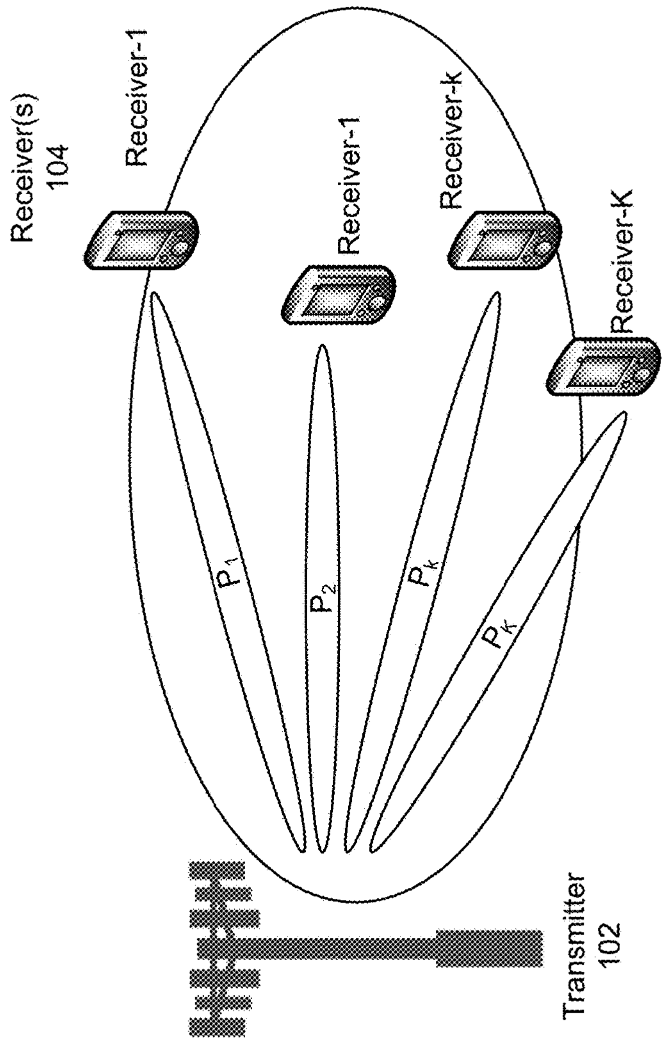
FIG. 1 is a diagram of an example associated with a transmission model of K-receiver 1-layer RSMA.

The following detailed description of example implementations refers to the accompanying drawings. The same reference numbers in different drawings may identify the same or similar elements.

RSMA is an emerging multiple access technique for multi-antenna systems that relies on precoded rate-splitting at a transmitter and successive interference cancellation (SIC) at receivers (e.g., UEs). RSMA may manage multi-receiver interference in a flexible and robust manner by partially decoding interference and partially treating the interference as noise. RSMA may encapsulate and outperform existing multiple access schemes, such as space division multiple access (SDMA) and non-orthogonal multiple access (NOMA).

Semantic communications may be used in order to address the requirements of next generation networks with the advancement of machine learning techniques. Semantic communications focuses on the communication problem beyond the "Technical Level", the fundamentals of which are laid out by Shannon, and aims to convey meaning or features of information instead of transmitting correct bits. Semantic communications is expected to change approaches for designing and measuring the performance of wireless networks, since the conventional design metrics and approaches fail to capture its potential and waste available resources. Consequently, new metrics may be considered to properly capture the needs of semantic networks, such as, AoII. AoII may address the shortcomings of the metric age of information (AoI) (e.g., an end-to-end metric that captures a semantic property known as the timeliness of information) by capturing the effect of content and data freshness together. AoII may capture not only the freshness of information but also the information content of transmitted packets. AoII has been considered among the candidate metrics to be used for designing semantic-aware networks.

The usage of RSMA may be considered in the context of semantic communications or AoI-based metrics. For example, RSMA may be considered for joint communication and computation in semantic communication networks. An optimization problem may be formulated to minimize the total energy consumption of the network under a latency constraint to find the optimal beamformers, transmit information accuracy, computation capacity, rate, and/or power allocation schemes for downlink transmission. RSMA may perform with the smallest total communication and computation energy among the compared multiple access schemes, which may include SDMA, NOMA and frequency division multiple access (FDMA). As another example, the AoI performance of RSMA for a two-receiver single-antenna downlink communication system over an AoI minimization problem may be investigated to find the optimal power allocation policy. In this case, RSMA may achieve a better AoI-energy trade-off than NOMA and orthogonal multiple access (OMA) under the considered system model.

However, the usage of RSMA has not been considered in the context of semantic communications and AoII-based metrics. The usage of RSMA has not been considered to minimize AoII in a multi-antenna network with an arbitrary number of receivers. RSMA may encapsulate and outperform existing multiple access schemes (e.g., SDMA and NOMA), so a design that minimizes AoII for multiple access systems using RSMA may be useful to improve an overall network performance.

In some implementations, a downlink multi-receiver communication framework based on RSMA (e.g., an RSMA-based transmission scheme) may be defined for semantic-aware networks. An optimization problem, such as an AoII minimization problem, may be formulated to obtain jointly an optimal receiver scheduling, precoding, resource allocation, and/or power allocation schemes, while minimizing AoII for multiple access systems. The AoII minimization problem may be formulated to jointly find the optimal receiver scheduling, precoding scheme, and power allocation design for RSMA in the multi-antenna network with the arbitrary number of receivers. The formulated AoII minimization problem may be non-convex and include conditional objective functions and constraints. The metric AoII may be considered in the objective function of the formulated problem to maximize the freshness of the overall information to be transmitted. Big-M techniques (e.g., "Big M" refers to a large number associated with artificial variables, represented by the letter M) and successive convex approximation (SCA) techniques may be used to convert the resulting non-convex problem with conditional objective and constraints into a convex one, and an iterative algorithm may be defined to solve the convex problem.

In some implementations, by designing a downlink multi-receiver communication framework based on RSMA in semantic-aware networks, and by formulating an optimization problem to jointly obtain optimal receiver scheduling, power allocation, and precoding, AoII may be minimized for multiple access systems. Such an approach using RSMA may result in a lower AoII than SDMA and other related techniques due to superior performance under multi-receiver interference, thereby improving an overall system performance.

FIG. 1 is a diagram of an example 100 associated with a transmission model of K-receiver 1-layer RSMA.

In some implementations, in a system model, a single transmitter 102 with N antennas may perform downlink communications with K single-antenna receivers 104 (e.g., K single-antenna receivers). A set of indexes associated with receivers may be denoted by $\mathcal{K}$. Transmissions may be performed in a time-slotted framework and time may be assumed to be normalized to a slot duration, such that the slot duration is taken as 1 and each transmission occurs at a time instance $t \in \mathbb{N}$. An information process $X_{t,k}$, $t \in \mathbb{N}$, $k \in \mathcal{K}$, may be observed for each receiver at the transmitter 102, which may change over time. Each receiver may have an estimate of the process $X_{t,k}$ at time instance t, denoted by $\widehat{X_{t,k}}$. The aim of the transmitter 102 is to update the receivers about the changes in $X_{t,k}$, e.g., keep $\widehat{X_{t,k}}$ up-to-date. Accordingly, the transmitter 102 may decide to transmit to receiver-k at time instance t when the transmitter 102 observes a certain amount of change in $X_{t,k}$.

In some implementations, when the transmitter 102 decides to send updates at time instance t, the transmitter 102 may schedule a particular number of receivers for transmission. The set of indexes for such receivers may be denoted as $\mathcal{L}_t \subseteq \mathcal{K}$. The transmission to the scheduled receivers may start at time instance t and finish at t+1. When receiver-k is able to successfully receive the update intended for receiver-k, receiver-k may update its estimate at t+1. The model $\widehat{X_t} = X_{U_t}$ may be considered for the process estimate at receiver-k, where $U_t$ is the timestamp of the last successfully received packet by a receiver at time t. In some implementations, when receiver-k is able to decode its update successfully, receiver-k may transmit an acknowledgement (ACK) packet to the transmitter 102. A transmission time for the ACK may be assumed to be negligible. When the ACK is not received at time instance t+1 from receiver-k, the transmitter 102 may drop the update $X_{t,k}$ and generate a new update $X_{t+1,k}$.

As indicated above, FIG. 1 is provided as an example. Other examples may differ from what is described with regard to FIG. 1.

In some implementations, RSMA may be considered for transmissions to scheduled receivers. RSMA is a robust and flexible multiple-access technique for multi-antenna networks. RSMA may involve performing message splitting at a transmitter by splitting receiver messages into common and private parts. The common parts of the receiver messages may be combined and encoded into a common stream to be decoded by a plurality of receivers (e.g., all receivers), and the private parts of the receiver messages may be encoded into private streams. A plurality of messages (e.g., all messages) may be superimposed in a non-orthogonal manner.

In some implementations, the message of receiver-k at time t, and its common and private parts may be denoted as $W_k$, $W_{c,k}$ and $W_{p,k}$, respectively. The subscript t may be dropped from the rate expressions for ease of notation. The transmitter may combine $W_{c,k}$, $\forall k \in \mathcal{K}$, into a common message $W_c$. The common message $W_c$ and private messages $W_{p,k}$ may be independently encoded into streams $s_c$ and $s_k$, respectively. Linear precoding may be applied to a plurality of streams (e.g., all streams), and the precoders for the common stream and the private stream of receiver-k may be denoted as $p_c \in \mathbb{C}^{n_t}$ and $p_k \in \mathbb{C}^{n_t}$, respectively. Accordingly, a transmit signal may be expressed as:

$$x = p_c s_c + \sum_{k=1}^{K} p_k s_k. \tag{1}$$

In some implementations, the streams may have unit power, such that, $E\{ss^H\} = I$ for $s = [s_c, s_1, \ldots, s_K]$. The transmitter may be assumed to have perfect channel state information at transmitter (CSIT) to calculate the precoders. The received signal at receiver-k may be represented as:

$$y_k = h_k^H x + z_k, \ \forall k \in \mathcal{K}, \tag{2}$$

where $h_k \in \mathbb{C}^N$ is a channel vector and $z_k \sim \mathcal{CN}(0, \sigma_n^2)$ is an additive white Gaussian noise (AWGN) at receiver-k.

In some implementations, at a receiver (e.g., UE side), the messages may be detected using a successive interference cancellation (SIC) algorithm. Each receiver may decode the common stream first to obtain a common message estimate $\hat{W}_c$ and extract its common message estimate $\widehat{W_{c,k}}$ by treating the private streams for the plurality of receivers (e.g., all receivers) as noise. The common stream may be reconstructed using $\hat{W}_c$ and subtracted from the received signal. Each UE may decode its intended private message $\widehat{W_{p,k}}$ by treating the private messages of other receivers as noise. Further, each receiver may combine the message estimates $\widehat{W_{c,k}}$ and $\widehat{W_{p,k}}$ to obtain its original message estimate $\hat{W}_k$.

In some implementations, a signal-to-interference-plus-noise ratio (SINR) for the common and private streams at receiver-k may be expressed by:

$$\gamma_{c,k} = \frac{|h_k^H p_c|^2}{1 + \sum_{i \in \mathcal{K}} |h_k^H p_i|^2}, \; \gamma_k = \frac{|h_k^H p_k|^2}{1 + \sum_{i \in \mathcal{K}, i \neq k} |h_k^H p_i|^2}, \tag{3}$$

respectively. Accordingly, the achievable rates $R_k = \log_2(1+\gamma_k)$ and $R_{c,k} = \log_2(1+\gamma_{c,k})$ bits/s/Hz may be defined. The common message should be decodable by the plurality of receivers (e.g., all receivers), and its achievable rate may be defined as $$R_c = \min_{k \in \mathcal{L}_t} R_{c,k}.$$

Further the common rate portion for receiver-k may be defined as $c_k$, such that, $\sum_{k \in \mathcal{L}_t} c_k = R_c$.

In some implementations, AoII may be considered to design a transmission framework based on RSMA. AoII may be used as a metric to capture the needs of semantics-empowered communications. AoII may address the shortcomings of AoI and error-based metrics in semantic communications by inferring the importance of data packets not only through their timestamps but also their content. AoII may be used as one of the metrics to design and evaluate semantic-aware networks.

In some implementations, $V_{t,k}$ may be defined as the last time instant where receiver-k had sufficiently accurate information about the process $X_{t,k}$. The AoII may be defined as:

$$\Delta_{AoII,k}(X_{t,k}, \widehat{X_{t,k}}, t) = f(t) \times g(X_{t,k}, \widehat{X_{t,k}}). \tag{4}$$

In (4), f(t) may increasingly penalize the system as long as the mismatch between $\widehat{X_{t,k}}$ and $\widehat{X_{t,k}}$ lasts, and $g(X_{t,k}, \widehat{X_{t,k}})$ quantifies the gap between $\widehat{X_{t,k}}$ and $\widehat{X_{t,k}}$ [10]. Some alternatives may be defined for f and g, such as:

$$f_{lin}(t) = t - V_{t,k}, \quad f_{thr}(t) = 1\{t - V_{t,k} \geq \zeta\}, \text{ and}$$

$$g_{sq}(X_{t,k}, \widehat{X_{t,k}}) = (X_{t,k} - \widehat{X_{t,k}})^2, \; g_{thr}(X_{t,k}, \widehat{X_{t,k}}) = 1\{|X_{t,k} - \widehat{X_{t,k}}| \geq c\},$$

where ζ and c are predefined thresholds. The f and g with 1{.} function may be used to design systems where small mismatches are tolerated, while the ones with linear and square functions may be used to penalize any mismatch.

In some implementations, an AoII minimization problem may be formulated to jointly optimize receiver scheduling, power allocation and precoding for an RSMA-based semantic-aware system design, and an iterative algorithm may be defined to solve the formulated problem, as described further herein.

Figure 2:
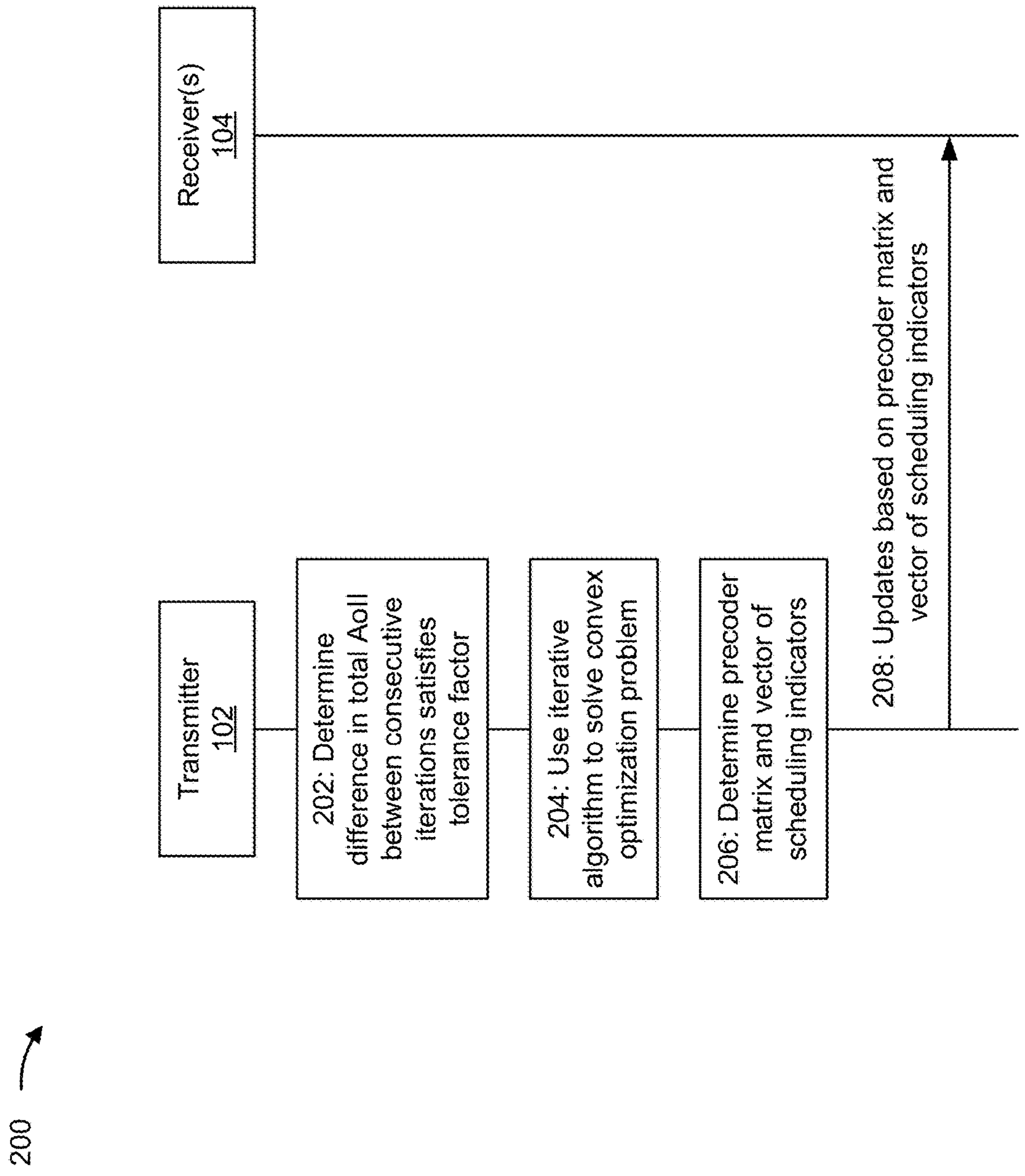
FIG. 2 is a diagram of an example associated with precoding and scheduling while minimizing AoII for multiple access systems.

FIG. 2 is a diagram of an example 200 associated with precoding and scheduling while minimizing AoII for multiple access systems. As shown in FIG. 2, example 200 includes a transmitter 102 and a receiver 104.

As shown by reference number 202, the transmitter 102 may determine that a difference between a total AoII obtained in a current iteration of an iterative algorithm and a total AoII in a previous iteration of the iterative algorithm satisfies a tolerance factor for algorithm convergence. The tolerance factor for algorithm convergence may be predefined at the transmitter 102. The transmitter 102 may be able to determine total AoII at different iterations, and the transmitter 102 may be able to determine when the difference in total AoII between consecutive iterations satisfies the tolerance factor for algorithm convergence.

As shown by reference number 204, the transmitter 102 may use, based on the difference satisfying the tolerance factor for algorithm convergence, the iterative algorithm to solve a convex optimization problem based on a plurality of iterations that continue until an objective function associated with AoII converges to within the tolerance factor for algorithm convergence. The convex optimization problem may be derived from a non-convex problem formulated to jointly obtain user scheduling, precoding, resource allocation, and power allocation schemes. The AoII may be a metric in the objective function of the convex optimization problem to maximize a freshness of overall information to be transmitted, and the freshness of overall information is maximized by minimizing the AoII. The transmitter 102 may update an iteration number between iterations when using the iterative algorithm to solve the convex optimization problem.

In some implementations, the transmitter 102 may solve the convex optimization problem using interior-point techniques to obtain the precoder matrix, the vector of scheduling indicators, a vector of auxiliary variables for a private stream SINR lower bound, a vector of auxiliary variables for a private stream SINR upper bound, a vector of auxiliary variables for a common stream SINR lower bound, a vector of auxiliary variables for a private stream IN upper bound, and a vector of auxiliary variables for a common stream IN upper bound.

In some implementations, at iteration n, the transmitter 102 may use variables obtained in the previous iteration in related constraints to solve the convex optimization problem using interior-point techniques, and the variables may be associated with a precoder matrix at iteration n, a vector of scheduling indicators at iteration n, a vector of auxiliary variables for a private stream SINR bound at iteration n, and a vector of auxiliary variables for a common stream IN upper bound at iteration n.

As shown by reference number 206, the transmitter 102 may determine a precoder matrix and a vector of scheduling indicators from a solving of the convex optimization problem. In other words, by solving the convex optimization problem, the transmitter 102 may obtain the precoder matrix and the vector of scheduling indicators. The transmitter 102 may derive the precoder matrix and the vector of scheduling indicators by iteratively solving the convex optimization problem, where iterations the continue until the objective function converges within the tolerance factor for algorithm convergence.

As shown by reference number 208, the transmitter 102 may transmit, using a downlink multi-user communication framework based on RSMA in a semantic-aware network, one or more updates to one or more receivers 104 (e.g., UEs) based on the precoder matrix and the vector of scheduling indicators. The RSMA may be associated with lower AoII as compared to SDMA, thereby improving an overall network performance.

In some implementations, as part of a problem formulation and solution, a sample may be assumed to be taken at t for each receiver 104, and $g(X_{t,k}, \widehat{X_{t,k}}) \neq 0$, $\forall k \in \mathcal{K}$. The transmitter 102 may aim to schedule the receivers 104 for transmission at t to minimize the AoII at time t+1. A slow process may be assumed for $X_{t,k}$, so that $g(X_{t+1,k}, \widehat{X_{t+1,k}})=0$ when a transmission decision is given and the transmission decision is successful. Otherwise, the transmission decision may not affect the freshness of the update and even the successfully transmitted packets may become obsolete by the time the packets are received.

In some implementations, $I_k$ may be defined as the rate required to successfully transmit the update $X_{t,k}$ in an interval between t and t+1 to achieve $g(X_{t+1,k}, \widehat{X_{t+1,k}})=0$. Since a time window of interest may be a single time duration (between t and t+1), the subscript t may be dropped in $I_{t,k}$ for ease of notation (similar as in the achievable rate expressions). An update may be successfully transmitted when the achievable rate at t for receiver-k is larger than a required rate, e.g., $c_k+R_k \geq I_k$. Since $X_{t,k}$ is assumed to be a slow process, a successful transmission of the update for receiver-k may result in $\Delta_{AoII,k}(X_{t,k}, \widehat{X_{t,k}}, t)=0$ (since $g(X_{t+1,k}, \widehat{X_{t+1,k}})=0$). Accordingly, AoII at t+1 may be expressed as:

$$\Delta_{AoII,k}(X_{t+1,k}, \widehat{X_{t+1,k}}, t+1) = \begin{cases} (t+1-V_{t+1,k})g(X_{t+1,k}, \widehat{X_{t+1,k}}), & \text{if } c_k+R_k \leq I_k, \\ 0, & \text{otherwise} \end{cases} \tag{5}$$

In some implementations, defining $\mathcal{L}=\{k \in \mathcal{K} : c_k+R_k \geq I_k\}$ as a set of scheduled receivers 104 and $P=[p_c, p_1, \ldots, p_K]$, the following optimization problem may be formulated to obtain the optimal scheduling, precoder, and power allocation scheme.

$$\min_{c,P} \sum_{k \in \mathcal{K}} \Delta_{AoII,k}(X_{t+1,k}, \hat{X}_{t+1,k}, t+1) \tag{6a}$$

$$\text{s.t.} \quad \sum_{k' \in \mathcal{K}} c_{k'} \leq R_{c,l}(P), \quad \forall l \in \mathcal{L}, \tag{6b}$$

$$c \geq 0, \tag{6c}$$

$$tr(PP^H) \leq P_{total}. \tag{6d}$$

In some implementations, the objective and constraint (6b) may be conditional in the formulated problem. A big-M technique may be used to convert the problem into a conventional form. The scheduling indicator vector $z=[z_1,$ $z_2, \ldots, z_K]$ with binary variables $z_k \in \{0,1\}$ may be defined to denote the case where receiver-k is not scheduled at time t, e.g., $z_k=1$ when $k \notin \mathcal{L}$ and $z_k=0$ otherwise. Then, (6) may be converted into the following problem.

$$\min_{c,P,z} \sum_{k \in \mathcal{K}} (t+1-V_{t+1,k})g(X_{t+1,k}, \hat{X}_{t+1,k})z_k \tag{7a}$$

$$\text{s.t.} \quad I_k - c_k - R_k \leq Mz_k, \quad \forall k \in \mathcal{K}, \tag{7b}$$

$$c_k + R_k - I_k \leq M(1-z_k), \quad \forall k \in \mathcal{K}, \tag{7c}$$

$$\sum_{k' \in \mathcal{K}} c_{k'} \leq R_{c,k}(P) + Mz_k, \quad \forall k \in \mathcal{K}, \tag{7d}$$

$$z_k \in \{0, 1\}, \quad \forall k \in \mathcal{K}, \tag{7e}$$

$$(6c), (6d).$$

In some implementations, the constraints (7b)-(7e) may be non-convex, which makes the problem a non-convex optimization problem. The constraint (7e) may be converted to a convex constraint by relaxing a binary requirement. The constraints (7b)-(7d) may be converted to convex constraints by applying SCA. Accordingly, the variables $\alpha_k$, $\beta_k$, $\omega_k$, $\sigma_{p,k}$, $\sigma_{c,k}$ and vectors $\alpha=[\alpha_1, \ldots, \alpha_K]$, $\beta=[\beta_1, \ldots, \beta_K]$, $\omega=[\omega_1, \ldots, \omega_K]$, $\sigma_p=[\sigma_{p,1}, \ldots, \sigma_{p,K}]$, $\sigma_c=[\sigma_1, \ldots, \sigma_{c,K}]$ may be introduced to write:

$$\min_{\substack{c,P,z,\\ \alpha,\beta,\omega,\\ \sigma_p,\sigma_k}} \sum_{k \in \mathcal{K}} (t+1-V_{t+1,k})g(X_{t+1,k}, \hat{X}_{t+1,k})z_k \tag{8a}$$

$$\text{s.t.} \quad I_k - c_k - \frac{\log(1+\alpha_k)}{\log(2)} \leq Mz_k, \quad \forall k \in \mathcal{K}, \tag{8b}$$

$$c_k + \frac{\log(1+\beta_k)}{\log(2)} - I_k \leq M(1-z_k), \quad \forall k \in \mathcal{K}, \tag{8c}$$

$$\sum_{k' \in \mathcal{K}} c_{k'} \leq \frac{\log(1+\omega_k)}{\log(2)} \leq Mz_k, \quad \forall k \in \mathcal{K} \tag{8d}$$

$$\frac{|h_k^H p_k|^2}{\sigma_{p,k}} \geq \alpha_k, \quad \frac{|h_k^H p_k|^2}{\sigma_{p,k}} \leq \beta_k, \quad \frac{|h_k^H p_c|^2}{\sigma_{c,k}} \geq \omega_k, \tag{8e}$$

$$\sigma_{p,k} \geq 1 + \sum_{\substack{i \in \mathcal{K},\\ i \neq k}} |h_k^H p_i|^2, \quad \forall k \in \mathcal{K}, \tag{8f}$$

$$\sigma_{c,k} \geq 1 + \sum_{i \in \mathcal{K}} |h_k^H p_i|^2, \quad \forall k \in \mathcal{K}, \tag{8g}$$

$$0 \leq z_k \leq 1, \quad \forall k \in \mathcal{K}, \tag{8h}$$

$$\prod_{k \in \mathcal{K}} z_k = 0, \tag{8i}$$

$$(6c), (6d).$$

In some implementations, the constraint (8i) may be added for easy convergence after a binary constraint is relaxed. First-order Taylor approximation may be applied to relax the constraints (8c), (8e), (8i) and obtain the following convex problem.

$$\min_{\substack{c,P,z,\\ \alpha,\beta,\omega,\\ \sigma_p,\sigma_c}} \sum_{k \in \mathcal{K}} (t+1-V_{t+1,k})g(X_{t+1,k}, \hat{X}_{t+1,k})z_k \tag{9a}$$

-continued $$\text{s.t. } c_k - \frac{\log\left(1+\beta_k^{[n-1]}\right)}{\log(2)} + \frac{\left(\beta_k - \beta_k^{[n-1]}\right)}{\left(1+\beta_k^{[n-1]}\right)\log(2)} - I_k \leq M(1-z_k),\ \forall\, k \in \mathcal{K}, \tag{9b}$$

$$\frac{2\mathcal{R}\left\{\left(p_k^{[n-1]}\right)^H h_k h_k^H p_k\right\}}{\sigma_{p,k}^{[n-1]}} - \frac{\left|h_k^H p_k^{[n-1]}\right|^2}{\left(\sigma_{p,k}^{[n-1]}\right)^2}\sigma_{p,k} \geq \alpha_k, \tag{9c}$$

$$\frac{2\mathcal{R}\left\{\left(p_k^{[n-1]}\right)^H h_k h_k^H p_k\right\}}{\sigma_{p,k}^{[n-1]}} - \frac{\left|h_k^H p_k^{[n-1]}\right|^2}{\left(\sigma_{p,k}^{[n-1]}\right)^2}\sigma_{p,k} \leq \beta_k, \tag{9d}$$

$$\frac{2\mathcal{R}\left\{\left(p_c^{[n-1]}\right)^H h_k h_k^H p_c\right\}}{\sigma_{c,k}^{[n-1]}} - \frac{\left|h_k^H p_c^{[n-1]}\right|^2}{\left(\sigma_{c,k}^{[n-1]}\right)^2}\sigma_{c,k} \geq \omega_k, \tag{9e}$$

$$\prod_{k\in\mathcal{K}} z_k^{[n-1]} + \sum_{k\in\mathcal{K}}\left(z_k - z_k^{[n-1]}\right)\prod_{l\in\mathcal{K},l\neq k} z_l^{[n-1]} = 0, \tag{9f}$$

$$(8b), (8d), (8f), (8g), (8h), (6c), (6d).$$

In some implementations, parameters with superscript [n−1] may represent variables to which the Taylor approximation is applied. The iterative algorithm may be defined to obtain the precoder matrix and receiver scheduling (or user scheduling). At iteration n, optimal variables obtained in a previous iteration, e.g., $P^{[n-1]}$, $z^{[n-1]}$, $\beta^{[n-1]}$, $\sigma_p^{[n-1]}$, $\sigma_c^{[n-1]}$ may be used in the related constraints to solve the convex problem using interior-point techniques. An interior-point technique (or interior-point method) may be an algorithm for solving convex optimization problems. The iterations may continue until the objective function converges within a tolerance of $\epsilon$.

In some implementations, the iterative algorithm (Algorithm 1) may be defined in accordance with the following:

| Algorithm 1: Proposed Algorithm |
| --- |
| $n \leftarrow 1, P^{[0]}, z^{[0]}, \beta^{[0]}, \sigma_c^{[0]}, \sigma_p^{[0]}, \Sigma\Delta_{AoII,k}^{[0]}$ |
| while $\lvert\Sigma\Delta_{AoII,k}^{[n]} - \Sigma\Delta_{AoII,k}^{[n-1]}\rvert \leq \epsilon$ do |
| \| Solve (9) using interior-point methods to obtain |
| \| $\Sigma\Delta_{AoII,k}^*, P^*, z^*, \alpha^*, \beta^*, \omega^*, \sigma_c^*, \sigma_p^*$; |
| \| $\Sigma\Delta_{AoII,k}^{[n]} \leftarrow \Delta_{AoII,k}^*, P^{[n]} \leftarrow P^*, z^{[n]} \leftarrow z^*,$ |
| \| $\beta^{[n]} \leftarrow \beta^*, \sigma_c^{[n]} \leftarrow \sigma_c^*, \sigma_p^{[n]} \leftarrow \sigma_p^*$; |
| \| $n \leftarrow n + 1$, |
| end |
| return $P \leftarrow P^{[n]}, z \leftarrow z^{[n]}$ |

In some implementations, the definitions of the parameters updated at each iteration of the iterative algorithm are defined as follows. The parameter $P^{[n]}$ may indicate a precoder matrix at iteration n. The parameter $z^{[n]}$ may indicate a vector of scheduling indicators at iteration n. The parameter $\beta^{[n]}$ may indicate a vector of auxiliary variables for private stream SINR upper bound at iteration n. The parameter $\sigma_p^{[n]}$ may indicate a vector of auxiliary variables for private stream interference-plus-noise (IN) upper bound at iteration n. The parameter $\sigma_c^{[n]}$ may indicate a vector of auxiliary variables for common stream IN upper bound at iteration n. The parameter P* may indicate a precoder matrix obtained by solving the problem (9) using interior-point techniques. The parameter z* may indicate a vector of scheduling indicators obtained by solving the problem (9) using interior-point techniques. The parameter $\alpha^*$ may indicate a vector of auxiliary variables for private stream SINR lower bound obtained by solving the problem (9) using interior-point techniques. The parameter $\beta^*$ may indicate a vector of auxiliary variables for private stream SINR upper bound obtained by solving the problem (9) using interior-point techniques. The parameter $\omega^*$ may indicate a vector of auxiliary variables for common stream SINR lower bound obtained by solving the problem (9) using interior-point techniques. The parameter $\sigma_p^*$ may indicate a vector of auxiliary variables for private stream IN upper bound obtained by solving the problem (9) using interior-point techniques. The parameter $\sigma_c^*$ may indicate a vector of auxiliary variables for common stream IN upper bound obtained by solving the problem (9) using interior-point techniques. The parameter e may indicate a tolerance factor for algorithm convergence.

In some implementations, an algorithm output z may contain the relaxed receiver scheduling indicators. Therefore, any type of algorithm may be used to obtain binary z variables, if required. A possible algorithm to obtain such variables is given as follows.

$$z_k' = \begin{cases} 1, & \text{if } z_k = 1 \text{ or } c_k(P) + R_k(P) \leq I_k. \\ 0, & \text{otherwise.} \end{cases} \tag{10}$$

The rates in (10) may be calculated using the precoders obtained from the iterative algorithm.

In some implementations, when using the iterative algorithm, the transmitter 102 may initialize a precoder matrix ($P^{[0]}$), a vector of scheduling indicators ($z^{[0]}$), a vector of auxiliary variables for a private stream SINR upper bound ($\beta^{[0]}$), a vector of auxiliary variables for a private stream IN upper bound ($\sigma_p^{[0]}$), and a vector of auxiliary variables for a common stream IN upper bound ($\sigma_c^{[0]}$).

In some implementations, during the usage of the iterative algorithm, while the difference between the total AoII in the current iteration and the total AoII in the previous iteration is above the tolerance factor for algorithm convergence, the transmitter 102 may solve the problem formulation in (9) using interior point techniques to obtain a total AoII ($\Sigma\Delta_{AoII}$), the precoder matrix (P*), the vector of scheduling indicators (z*), the vector of auxiliary variables for the private stream SINR lower bound ($\alpha^*$), the vector of auxiliary variables for the private stream SINR upper bound ($\beta^*$), the vector of auxiliary variables for the common stream SINR lower bound ($\alpha^*$), the vector of auxiliary variables for the private stream IN upper bound ($\sigma_p^*$), and the vector of auxiliary variables for common stream IN upper bound ($\sigma_c^*$). Further, the transmitter 102 may solve the problem formulation in (9) using a precoder matrix at the previous iteration ($P^{[n-1]}$), the vector of scheduling indicators at the previous iteration ($z^{[n-1]}$), the vector of auxiliary variables for private stream SINR upper bound at the previous iteration ($\beta^{[n-1]}$), the vector of auxiliary variables for private stream IN upper bound at the previous iteration ($\sigma_p^{[n-1]}$), and the vector of auxiliary variables for common stream IN upper bound at the previous iteration ($\sigma_c^{[n-1]}$). In some implementations, the transmitter 102 may update such values and update an iteration number. The transmitter 102 may continue the iterations until the objective function converges within the tolerance of $\epsilon$, at which point the precoder matrix and the vector of scheduling indicators may be returned. The transmitter 102 may use the iterative algorithm to obtain the precoder matrix and the receiver scheduling. A convergence of the iterative algorithm may be guaranteed since the solution of (9) at iteration n is also a feasible solution at iteration n+1. Therefore, the objective function is monotonically decreasing and is bounded below by zero.

In some implementations, a performance of the iterative algorithm may be analyzed and compared with that of SDMA. SDMA may be a special case of RSMA when no power is allocated to a common stream $s_c$ and $W_k$ is encoded into $s_k$. RSMA may schedule both receivers 104 for larger I values than SDMA, especially in scenarios where the receivers 104 are spatially close. In such scenarios, canceling the multi-receiver interference becomes challenging, which affects the SINR of the interference-free streams, and thus limits the achievable rates. This results in SDMA failing to satisfy the rate requirements of one of the receivers 104 when I is increased above certain levels. RSMA may achieve such performance by splitting the required rate between common and private streams and increasing the achievable rate of each receiver 104 using the common stream when using the private streams only is not enough to satisfy the rate requirements.

In some implementations, the performance of RSMA for downlink multi-receiver communications in semantic-aware networks may be evaluated. The optimization problem may be formulated to design the optimal receiver scheduling, precoding, and power allocation schemes jointly. The sum AoII may be considered as the objective function to minimize. Further, big-M and SCA may be applied to the formulated problem, and the iterative algorithm may be used to solve the formulated problem. RSMA may achieve a lower AoII than SDMA owing to its superior performance under multi-receiver interference even under perfect CSIT.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
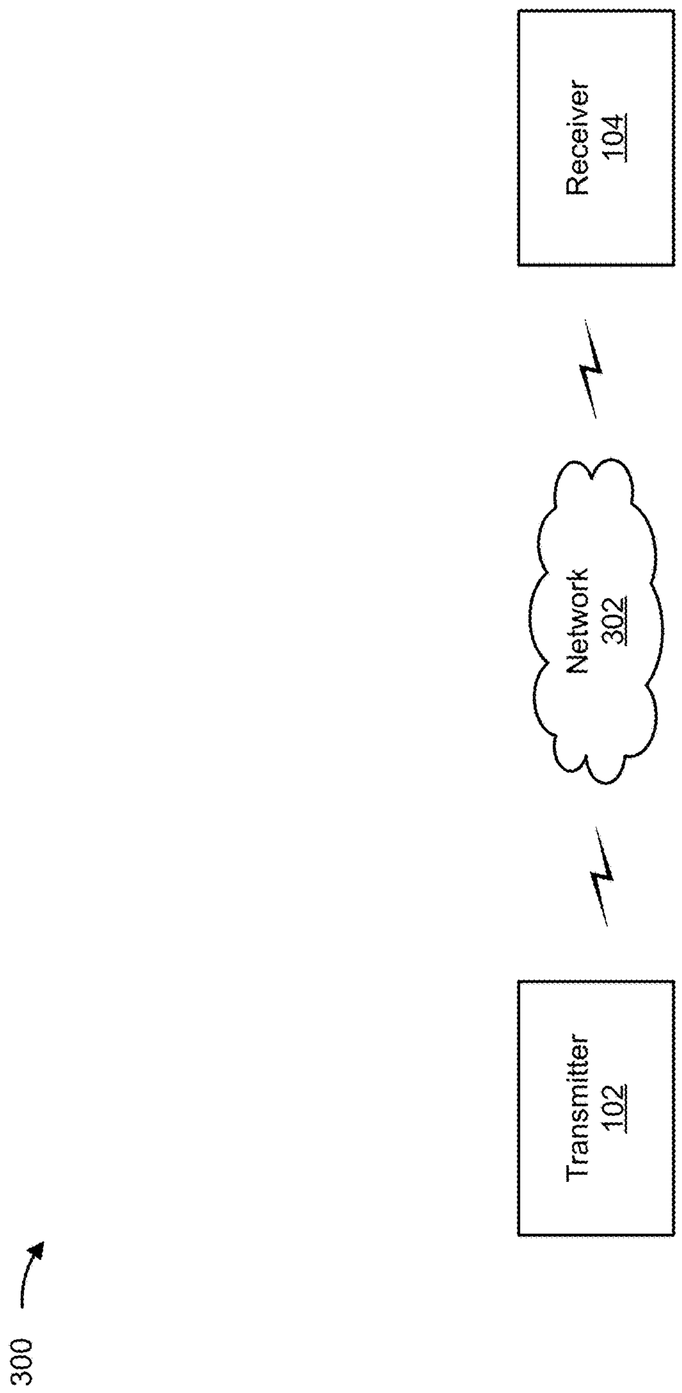
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a transmitter 102, a receiver 104, and a network 302. Devices of environment 300 may interconnect via wired connections, wireless connections, or a combination of wired and wireless connections.

The transmitter 102 may include one or more devices capable of receiving, processing, storing, routing, and/or providing information associated with precoding and scheduling while minimizing AoII for multiple access systems, as described elsewhere herein. The transmitter 102 may be an aggregated network node, meaning that the aggregated network node is configured to utilize a radio protocol stack that is physically or logically integrated within a single radio access network (RAN) node (e.g., within a single device or unit). The transmitter 102 may be a disaggregated network node (sometimes referred to as a disaggregated base station), meaning that the transmitter 102 is configured to utilize a protocol stack that is physically or logically distributed among two or more nodes (such as one or more central units (CUs), one or more distributed units (DUs), or one or more radio units (RUs)). The transmitter 102 may include, for example, a New Radio (NR) base station, a Long Term Evolution (LTE) base station, a Node B, an eNB (e.g., in Fourth Generation (4G)), a gNB (e.g., in Fifth Generation (5G)), an access point, a transmission reception point (TRP), a DU, an RU, a CU, a mobility element of a network, a core network node, a network element, a network equipment, and/or a RAN node.

The receiver 104 may include one or more devices capable of receiving, generating, storing, processing, and/or providing information associated with precoding and scheduling while minimizing AoII for multiple access systems, as described elsewhere herein. The receiver 104 may be a UE, which may include a communication device and/or a computing device. For example, the receiver 104 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 302 may include one or more wired and/or wireless networks. For example, the network 302 may include a cellular network (e.g., a 5G network, a 4G network, an LTE network, a Third Generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 302 may enable communication among the one or more devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
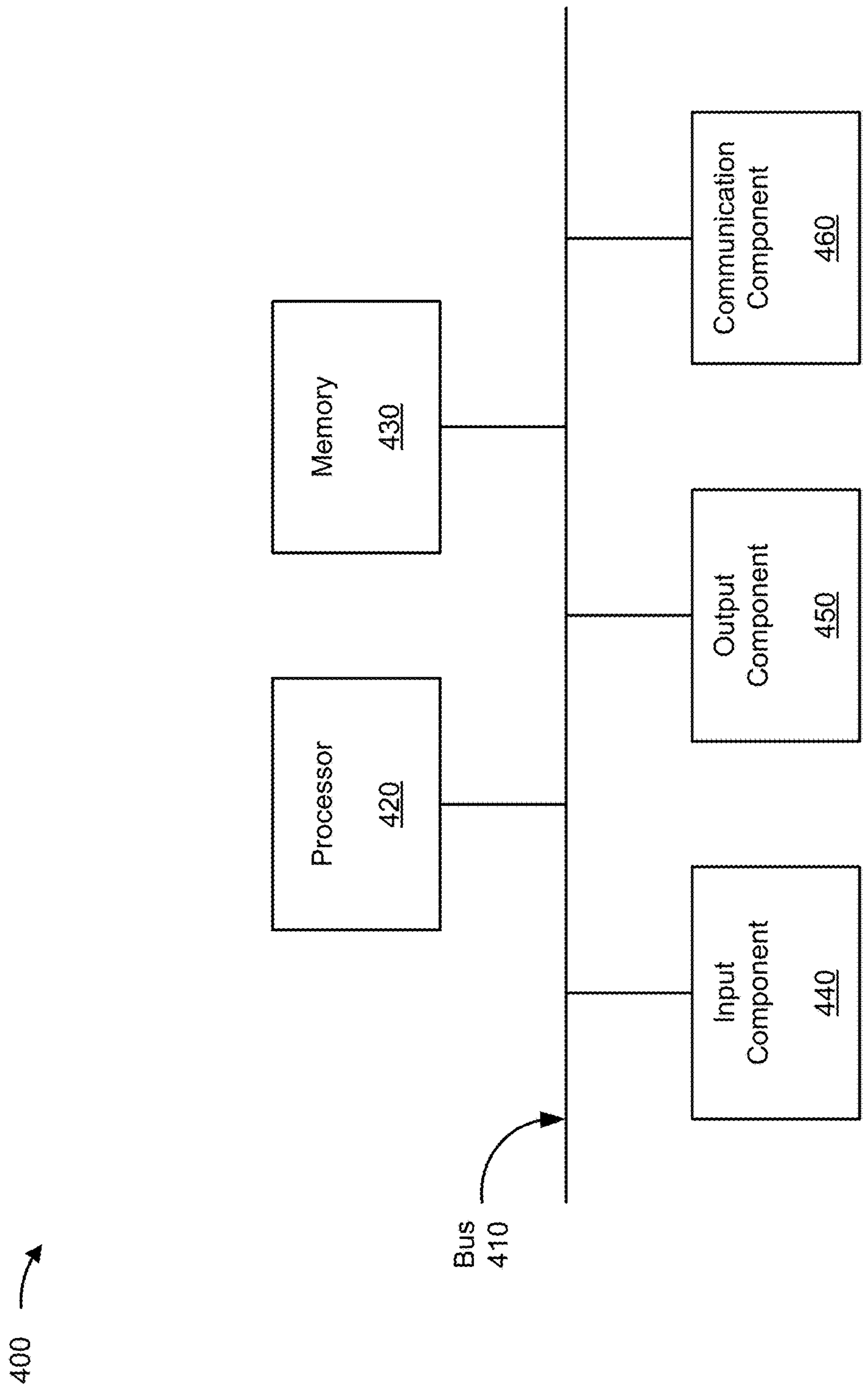
FIG. 4 is a diagram of example components of one or more devices of FIG. 3.

FIG. 4 is a diagram of example components of a device 400 associated with precoding and scheduling while minimizing AoII for multiple access systems. The device 400 may correspond to a transmitter (e.g., transmitter 102). In some implementations, the transmitter may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
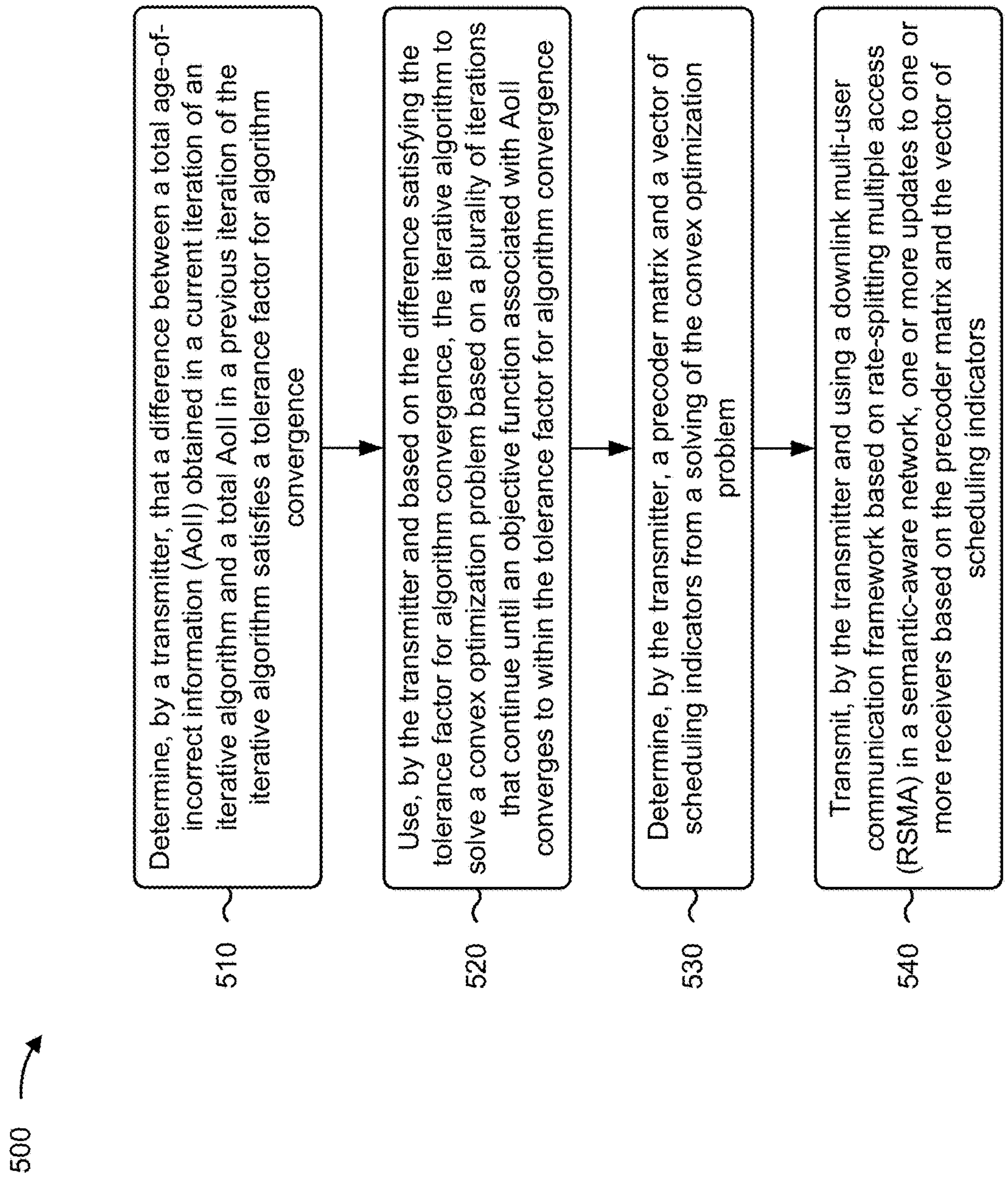
FIG. 5 is a flowchart of an example process relating to precoding and scheduling while minimizing AoII for multiple access systems.

FIG. 5 is a flowchart of an example process 500 associated with precoding and scheduling while minimizing AoII for multiple access systems. In some implementations, one or more process blocks of FIG. 5 may be performed by a transmitter (e.g., transmitter 102). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include determining, by the transmitter, that a difference between a total AoII obtained in a current iteration of an iterative algorithm and a total AoII in a previous iteration of the iterative algorithm satisfies a tolerance factor for algorithm convergence (block 510).

As shown in FIG. 5, process 500 may include using, by the transmitter and based on the difference satisfying the tolerance factor for algorithm convergence, the iterative algorithm to solve a convex optimization problem based on a plurality of iterations that continue until an objective function associated with AoII converges to within the tolerance factor for algorithm convergence (block 520). The convex optimization problem may be derived from a non-convex problem formulated to jointly obtain user scheduling, precoding, resource allocation, and power allocation schemes. The AoII may be a metric in the objective function of the convex optimization problem to maximize a freshness of overall information to be transmitted, and the freshness of overall information is maximized by minimizing the AoII. The transmitter may update an iteration number between iterations when using the iterative algorithm to solve the convex optimization problem.

In some implementations, the transmitter may solve the convex optimization problem using interior-point techniques to obtain the precoder matrix, the vector of scheduling indicators, a vector of auxiliary variables for a private stream SINR lower bound, a vector of auxiliary variables for a private stream SINR upper bound, a vector of auxiliary variables for a common stream SINR lower bound, a vector of auxiliary variables for a private stream IN upper bound, and a vector of auxiliary variables for a common stream IN upper bound.

In some implementations, at iteration n, variables obtained in the previous iteration may be used in related constraints to solve the convex optimization problem using interior-point techniques, and the variables may be associated with a precoder matrix at iteration n, a vector of scheduling indicators at iteration n, a vector of auxiliary variables for a private stream SINR bound at iteration n, and a vector of auxiliary variables for a common stream IN upper bound at iteration n.

As shown in FIG. 5, process 500 may include determining, by the transmitter, a precoder matrix and a vector of scheduling indicators from a solving of the convex optimization problem (block 530). In other words, by solving the convex optimization problem, the transmitter may obtain the precoder matrix and the vector of scheduling indicators.

As shown in FIG. 5, process 500 may include transmitting, by the transmitter and using a downlink multi-user communication framework based on RSMA in a semantic-aware network, one or more updates to one or more receivers based on the precoder matrix and the vector of scheduling indicators (block 540). The RSMA may be associated with lower AoII as compared to space division multiple access (SDMA), thereby improving an overall network performance.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

determining, by a transmitter, that a difference between a total age of incorrect information (AoII) obtained in a current iteration of an iterative algorithm and a total AoII in a previous iteration of the iterative algorithm satisfies a tolerance factor for algorithm convergence;

using, by the transmitter and based on the difference satisfying the tolerance factor for algorithm convergence, the iterative algorithm to solve a convex optimization problem based on a plurality of iterations that continue until an objective function associated with AoII converges to within the tolerance factor for algorithm convergence, wherein the convex optimization problem is derived from a non-convex problem formulated to jointly obtain user scheduling, precoding, resource allocation, and power allocation schemes, and wherein using the iterative algorithm to solve the convex optimization problem comprises:

solving, at each iteration of the plurality of iterations and based on using one or more transmission variables, one or more schedule variables, and one or more auxiliary variables, the convex optimization problem using interior-point techniques, wherein the one or more transmission variables, the one or more scheduling variables, and the one or more auxiliary variables are obtained in the previous iteration, and continuing, based on the convex optimization problem, the plurality of iterations until the objective function converges within the tolerance factor for algorithm convergence;

determining, by the transmitter, a precoder matrix, a vector of scheduling indicators, and a vector of auxiliary variable when the objective function converges with the tolerance factor for solving of the convex optimization problem;

scheduling, by the transmitter and using the vector of scheduling indicators, one or more receivers for transmission;

combining, by the transmitter and based on the vector of auxiliary variable, common parts of receiver messages into a common stream for the one or more receivers;

encoding, by the transmitter and based on the vector of auxiliary variable, private parts of the receiver messages into private streams for the one or more receivers;

applying, by the transmitter, linear precoding to the common stream and the private streams using the precoder matrix to generate precoded streams; and transmitting, by the transmitter and using a downlink multi-user communication framework based on rate-splitting multiple access (RSMA) in a semantic-aware network, the precoded streams to the one or more receivers.

2. The method of claim 1, wherein the AoII is a metric in the objective function of the convex optimization problem to maximize a freshness of overall information to be transmitted, and the freshness of overall information is maximized by minimizing the AoII using the plurality of iterations of the iterative algorithm.

3. The method of claim 1, further comprising solving the convex optimization problem using interior-point techniques to obtain:

the precoder matrix, the vector of scheduling indicators, a vector of auxiliary variables for a private stream signal-to-interference-plus-noise ratio (SINR) lower bound, a vector of auxiliary variables for a private stream SINR upper bound, a vector of auxiliary variables for a common stream SINR lower bound, a vector of auxiliary variables for a private stream interference-plus-noise (IN) upper bound, and a vector of auxiliary variables for a common stream IN upper bound.

4. The method of claim 1, wherein at iteration n, where n is an integer, the one or more transmission variables, the one or more schedule variables, and the one or more auxiliary variables obtained in the previous iteration are used in related constraints to solve the convex optimization problem using interior-point techniques, and the one or more transmission variables include a precoder variable at iteration n, the one or more schedule variables include a scheduling variable at iteration n, and the one or more auxiliary variables include a private stream signal-to-interference-plus-noise ratio (SINR) bound at iteration n and a common stream interference-plus-noise (IN) upper bound at iteration n.

5. The method of claim 1, wherein the RSMA is associated with lower AoII as compared to space division multiple access (SDMA).

6. The method of claim 1, further comprising:

updating an iteration number between iterations when using the iterative algorithm to solve the convex optimization problem.

7. The method of claim 1, wherein the one or more updates are transmitted to a single antenna receiver.

8. A transmitter, comprising:

one or more memories; and one or more processors, communicatively coupled to the one or more memories, configured to:

determine that a difference between a total age of incorrect information (AoII) obtained in a current iteration of an iterative algorithm and a total AoII in a previous iteration of the iterative algorithm satisfies a tolerance factor for algorithm convergence;

use, based on the difference satisfying the tolerance factor for algorithm convergence, the iterative algorithm to solve a convex optimization problem based on a plurality of iterations that continue until an objective function associated with AoII converges to within the tolerance factor for algorithm convergence, wherein the convex optimization problem is derived from a non-convex problem formulated to jointly obtain user scheduling, precoding, resource allocation, and power allocation schemes, wherein, to use the iterative algorithm to solve the convex optimization problem, the one or more processors are configured to:

solve, at each iteration of the plurality of iterations and based on using one or more transmission variables, one or more schedule variables, and one or more auxiliary variables, the convex optimization problem using interior-point techniques, wherein the one or more transmission variable and the one or more scheduling variable are obtained in the previous iteration, and continue, and based on solving the convex optimization problem, the plurality of iterations until the objective function converges within the tolerance factor for algorithm convergence;

determine a precoder matrix, a vector of scheduling indicators, and a vector of auxiliary variable when the objective function converges with the tolerance factor for solving of the convex optimization problem;

schedule, using the vector of scheduling indicators, one or more receivers for transmission;

combine, based on the vector of auxiliary variable, common parts of receiver messages into a common stream for the one or more receivers;

encode, based on the vector of auxiliary variable, private parts of the receiver messages into private streams for the one or more receivers;

apply linear precoding to the common stream and the private streams using the precoder matrix to generate precoded streams; and transmit, using a downlink multi-user communication framework based on rate-splitting multiple access (RSMA) in a semantic-aware network, the precoded streams to the one or more receivers.

9. The transmitter of claim 8, wherein the AoII is a metric in the objective function of the convex optimization problem to maximize a freshness of overall information to be transmitted, and the freshness of overall information is maximized by minimizing the AoII using the plurality of iterations of the iterative algorithm.

10. The transmitter of claim 8, wherein the one or more processors are further configured to solve the convex optimization problem using interior-point techniques during the plurality of iterations to obtain:

the precoder matrix, the vector of scheduling indicators, a vector of auxiliary variables for a private stream signal-to-interference-plus-noise ratio (SINR) lower bound, a vector of auxiliary variables for a private stream SINR upper bound, a vector of auxiliary variables for a common stream SINR lower bound, a vector of auxiliary variables for a private stream interference-plus-noise (IN) upper bound, and a vector of auxiliary variables for a common stream IN upper bound.

11. The transmitter of claim 8, wherein at iteration n, where n is an integer, the one or more transmission variables, the one or more schedule variables, and the one or more auxiliary variables obtained in the previous iteration are used in related constraints to solve the convex optimization problem using interior-point techniques, and the one or more transmission variables include a precoder variable at iteration n, the one or more schedule variables include a scheduling variable at iteration n, and oen or more auxiliary variables include a private stream signal-to-interference-plus-noise ratio (SINR) bound at iteration n and a common stream interference-plus-noise (IN) upper bound at iteration n.

12. The transmitter of claim 8, wherein the RSMA is associated with lower AoII as compared to space division multiple access (SDMA).

13. The transmitter of claim 8, wherein the one or more processors are further configured to:

update an iteration number between iterations when using the iterative algorithm to solve the convex optimization problem.

14. The transmitter of claim 8, wherein the one or more updates are transmitted to a single antenna receiver.

15. A non-transitory computer-readable medium storing a set of instructions, the set of instructions comprising:

one or more instructions that, when executed by one or more processors of a transmitter, cause the transmitter to:

determine that a difference between a total age of incorrect information (AoII) obtained in a current iteration of an iterative algorithm and a total AoII in a previous iteration of the iterative algorithm satisfies a tolerance factor for algorithm convergence;

use, based on the difference satisfying the tolerance factor for algorithm convergence, the iterative algorithm to solve a convex optimization problem based on a plurality of iterations that continue until an objective function associated with AoII converges to within the tolerance factor for algorithm convergence, wherein the convex optimization problem is derived from a non-convex problem formulated to jointly obtain user scheduling, precoding, resource allocation, and power allocation schemes, and wherein, to use the iterative algorithm to solve the convex optimization problem, the one or more instructions cause the transmitter to:

solve, at each iteration of the plurality of iterations and based on using one or more transmission variables, one or more schedule variables, and one or more auxiliary variables, the convex optimization problem using interior-point techniques, wherein the one or more transmission variable and the one or more scheduling variable are obtained in the previous iteration, and continue, based on solving the convex optimization problem, the plurality of iterations until the objective function converges within the tolerance factor for algorithm convergence;

determine a precoder matrix, a vector of scheduling indicators, and a vector of auxiliary variable when the objective function converges with the tolerance factor for solving of the convex optimization problem;

schedule, using the vector of scheduling indicators, one or more receivers for transmission;

combine, based on the vector of auxiliary variable, common parts of receiver messages into a common stream for the one or more receivers;

encode, based on the vector of auxiliary variable, private parts of the receiver messages into private streams for the one or more receivers;

apply linear precoding to the common stream and the private streams using the precoder matrix to generate precoded streams; and transmit, using a downlink multi-user communication framework based on rate-splitting multiple access (RSMA) in a semantic-aware network, the precoded streams to the one or more receivers.

16. The non-transitory computer-readable medium of claim 15, wherein the AoII is a metric in the objective function of the convex optimization problem to maximize a freshness of overall information to be transmitted, and the freshness of overall information is maximized by minimizing the AoII using the plurality of iterations of the iterative algorithm.

17. The non-transitory computer-readable medium of claim 15, wherein the one or more instructions, when executed by the one or more processors, further cause the transmitter to solve the convex optimization problem using interior-point techniques during the plurality of iterations to obtain:

the precoder matrix, the vector of scheduling indicators, a vector of auxiliary variables for a private stream signal-to-interference-plus-noise ratio (SINR) lower bound, a vector of auxiliary variables for a private stream SINR upper bound, a vector of auxiliary variables for a common stream SINR lower bound, a vector of auxiliary variables for a private stream interference-plus-noise (IN) upper bound, and a vector of auxiliary variables for a common stream IN upper bound.

18. The non-transitory computer-readable medium of claim 15, wherein at iteration n, where n is an integer, the one or more transmission variables, the one or more schedule variables, and the one or more auxiliary variables obtained in the previous iteration are used in related constraints to solve the convex optimization problem using interior-point techniques, and the one or more transmission variables include a precoder variable at iteration n, the one or more schedule variables include a scheduling variable at iteration n, and the one or more auxiliary variables include a private stream signal-to-interference-plus-noise ratio (SINR) bound at iteration n and a common stream interference-plus-noise (IN) upper bound at iteration n.

19. The non-transitory computer-readable medium of claim 15, wherein the RSMA is associated with lower AoII as compared to space division multiple access (SDMA).

20. The non-transitory computer-readable medium of claim 15, wherein the one or more updates are transmitted to a single antenna receiver.

* * * * *